United States Patent
Wu et al.

(10) Patent No.: US 12,015,271 B2
(45) Date of Patent: Jun. 18, 2024

(54) POWER DISTRIBUTION NETWORK RELIABILITY INDEX CALCULATION METHOD AND APPARATUS BASED ON MIXED INTEGER LINEAR PROGRAMMING, AND MEDIUM

(71) Applicant: Tsinghua University, Beijing (CN)

(72) Inventors: Wenchuan Wu, Beijing (CN); Boming Zhang, Beijing (CN); Zihao Li, Beijing (CN); Hongbin Sun, Beijing (CN); Bin Wang, Beijing (CN); Qinglai Guo, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 374 days.

(21) Appl. No.: 17/500,539

(22) Filed: Oct. 13, 2021

(65) Prior Publication Data

US 2022/0037883 A1 Feb. 3, 2022

Related U.S. Application Data (63) Continuation of application No. PCT/CN2019/101429, filed on Aug. 19, 2019.

(30) Foreign Application Priority Data

May 24, 2019 (CN) .......................... 201910439195.2

(51) Int. Cl.
*H02J 3/00* (2006.01)
*G05B 17/02* (2006.01)
*G06F 17/12* (2006.01)

(52) U.S. Cl.
CPC .............. *H02J 3/001* (2020.01); *G05B 17/02* (2013.01); *G06F 17/12* (2013.01); *H02J 2203/20* (2020.01)

(58) Field of Classification Search
CPC ........... H02J 3/001; G05B 17/02; G06F 17/12
(Continued)

(56) References Cited

U.S. PATENT DOCUMENTS

| | | | |
|---|---|---|---|
| 2013/0024043 A1* | 1/2013 | Shaffer | H02H 7/30 700/297 |
| 2020/0176985 A1* | 6/2020 | Habib | H02J 13/00034 |

(Continued)

FOREIGN PATENT DOCUMENTS

CN 107748956 A * 3/2018 ......... G06Q 10/0639

OTHER PUBLICATIONS

WIPO, International Search Report for International Application No. PCT/CN2019/101429, Feb. 28, 2020.

*Primary Examiner* — Mohammad Ali
*Assistant Examiner* — Joshua T Sanders
(74) *Attorney, Agent, or Firm* — Hodgson Russ LLP (57) ABSTRACT

The disclosure provides power distribution network reliability index calculation method based on mixed integer linear programming. The method includes: establishing a model for optimizing reliability indexes of a power distribution network based on a mixed integer linear programming model, wherein the model comprises an objective function and constraint conditions, the objective function is for minimizing a system average interruption duration index (SAIDI); solving the model based on the objective function and the constraint conditions to obtain reliability indexes of the power distribution network; and controlling operation of the power distribution network based on the reliability indexes.

17 Claims, 1 Drawing Sheet

(58) Field of Classification Search
USPC .......................................................... 700/292
See application file for complete search history.

(56) References Cited

U.S. PATENT DOCUMENTS

2020/0242188 A1* 7/2020 Winger ................. G06F 9/3851
2021/0334429 A1* 10/2021 Wu ..................... H02J 3/00125

* cited by examiner

POWER DISTRIBUTION NETWORK RELIABILITY INDEX CALCULATION METHOD AND APPARATUS BASED ON MIXED INTEGER LINEAR PROGRAMMING, AND MEDIUM

CROSS-REFERENCE TO RELATED APPLICATIONS

This application is a continuation of International Application No. PCT/CN2019/101429, filed on Aug. 19, 2019, which claims priority to and benefits of Chinese Patent Application No. 201910439195.2, filed on May 24, 2019, the entire contents of which are incorporated herein by reference.

FIELD

The present disclosure relates to a technology field of power system planning and evaluation, and more particularly to a power distribution network reliability index calculation method and apparatus based on mixed integer linear programming, and a storage medium.

BACKGROUND

In the power field, reliability refers to an ability of the power system to continuously satisfy quantity and quality of power demand for customers. However, a requirement of reliability in the planned power distribution network in related arts may not be satisfied.

SUMMARY

Embodiments of the present disclosure provide a power distribution network reliability index calculation method based on mixed integer linear programming, including: establishing a model for optimizing reliability indexes of a power distribution network based on a mixed integer linear programming model, wherein the model comprises an objective function and constraint conditions, the objective function is for minimizing a system average interruption duration index (SAIDI); and solving the model based on the objective function and the constraint conditions to obtain reliability indexes of the power distribution network; and controlling operation of the power distribution network based on the reliability indexes.

Embodiments of the present disclosure provide a power distribution network reliability index calculation apparatus based on mixed integer linear programming, including: a processor; and a memory for storing instructions executable by the processor. The processor is configured to carry out the above method.

Embodiments of the present disclosure provide a non-transitory computer-readable storage medium having stored therein instructions that, when executed by a processor of a terminal, causes the terminal to perform the above method.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure. Examples of the embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

The reliability of the power distribution network may include the following indexes: a customer interruption frequency (CIF), a customer interruption duration (CID), a system average interruption frequency index (SAIFI), a system average interruption duration index (SAIDI), an expected energy not supplied (EENS). According to the current national standard "DL/T 1563-2016 Reliability Evaluation Guidelines for Medium-Voltage Distribution Networks", the above reliability indexes are necessary indexes for evaluating the reliability of power distribution networks.

In the currently applied reliability evaluation method for distribution networks, these reliability indexes are usually calculated by using a simulation-based method, that is, stochastic production simulation. This calculation method first generates numerous Monte Carlo samples based on equipment failures and failure rates, calculates the power supply status of the distribution network in the samples, and stores and counts them; finally, the reliability index is calculated from the statistical results. This method takes a long time and requires a large storage space; and cannot consider load recovery operations after a failure, which may lead to underestimation of reliability indexes.

The present disclosure provides a power distribution network reliability index calculation method based on mixed integer linear programming. With this method, model for optimizing reliability indexes of a power distribution network based on a mixed integer linear programming model is established, and reliability indexes of the power distribution network may be directly obtained by solving the model rather than obtained by sampling calculation, thus avoiding an iterative calculation of the conventional planning of the power distribution network, and improving the efficiency of evaluating the reliability of the power distribution network. Detailed description of the solution of the disclosure is further made with reference to detailed embodiments.

A power distribution network reliability index calculation method based on mixed integer linear programming is provided in the disclosure. The method is described in detail with reference to embodiments of the present disclosure.

Figure 1:
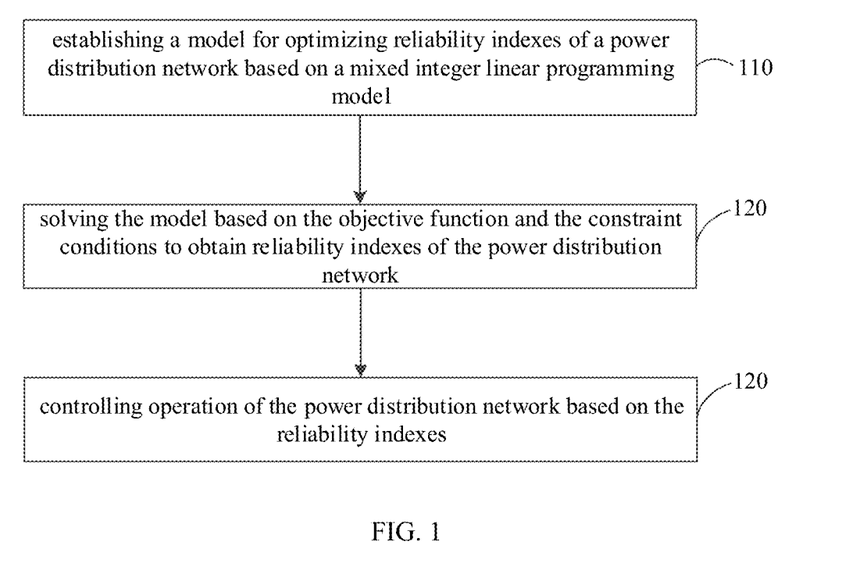
FIG. 1 is a flow chart of a power distribution network reliability index calculation method based on mixed integer linear programming according to an embodiment of the present disclosure.

FIG. 1 is a flow chart of a power distribution network reliability index calculation method based on mixed integer linear programming according to an embodiment of the present disclosure. As illustrated in FIG. 1, the method includes the following.

At block 110, a model for optimizing reliability indexes of a power distribution network based on a mixed integer linear programming model is established, the model comprises an objective function and constraint conditions, the objective function ensuring minimizing a system average annual interruption duration index (SAIDI).

At block 120, the model is solved based on the objective function and the constraint conditions to obtain reliability indexes of the power distribution network.

At block 130, operation of the power distribution network is controlled based on the reliability indexes.

The detail method may be described as follows.

1) Installation status of components, fault isolation, load transformation supply and action rules of fault recovery when there is a branch fault. Details may be as follows.

When there is a branch fault, the power system first enters a circuit breaker action stage. In the circuit breaker action stage, the circuit breaker closest to a faulty branch at upstream of the faulty branch is activated, and the faulty current is interrupted. At this time, the downstream node of the circuit breaker is powered off. And then, a switch action stage is entered, fault isolation is performed and the faulty branch is isolated. At the same time, network reconfiguration is performed through the circuit breaker action and the switch action, the load of power-off nodes are restored to the maximum, in a condition that only full load or no load can be restored. After that, the faulty branch is restored. The original power supply network structure is recovered through the actions of the switch and the circuit breaker after restoration.

Both ends of each branch may be installed with circuit breakers and switches. The circuit breaker can interrupt faulty current. The switch may include a section switch and a tie switch. The switch cannot interrupt faulty current. The status of the circuit breaker and the switch are known in a normal operating status.

2) A model for optimizing reliability indexes of a power distribution network based on a mixed integer linear programming model. The model includes an objective function and constraint conditions. Details are as follows.

2-1) The objective function is determined.

The objective function of the model is for minimizing a system average interruption duration index (SAIDI), denoted as:

$$\text{Minimize: SAIDI} \tag{1}$$

2-2) The constraint conditions are determined. Details are as follows.

2-2-1) A power balance constraint of the power distribution network is determined, and denoted as:

$$D_i^{xy} = \sum_{j \in \Psi_i} P_{ji}^{xy}, \forall i \in \Psi^{LN}, \forall xy \in \Upsilon \tag{2}$$

$$P_{ij}^{xy} = -P_{ji}^{xy}, \forall ij \in \Upsilon, \forall xy \in \Upsilon \tag{3}$$

Where a superscript xy represents a scenario where a fault occurs in a branch xy, $D_i^{xy}$ represents a load of a node i when the fault occurs in the branch xy, $P_{ji}^{xy}$ represents a power of a branch ij flowing from a node j to the node i when the fault occurs in the branch xy, $P_{ij}^{xy}$ represents a power of a branch ij flowing from the node i to the node j when the fault occurs in the branch xy, $\Psi_i$ represents a collection of branches directly coupled to the node i, $\Psi^{LN}$ represents a collection of nodes having loads, Y represents a collection of all branches, and $\forall xy \in Y$ represents all branch fault scenarios.

2-2-2) A branch power constraint is determined. Details are as follows.

$$-M s_{ij}^{i,xy} \leq P_{ij}^{xy} \leq M s_{ij}^{i,xy}, \forall ij \in Y, \forall xy \in Y \tag{4}$$

$$-M s_{ij}^{j,xy} \leq P_{ij}^{xy} \leq M s_{ij}^{j,xy}, \forall ij \in Y, \forall xy \in Y \tag{5}$$

$$-P_{ij}^C \leq P_{ij}^{xy} \leq P_{ij}^C, \forall ij \in Y, \forall xy \in Y \tag{6}$$

Where, M is large number which may be greater than a value of a maximum capacity $$\max_{ij \in \Upsilon}(P_{ij}^C)$$

of all branches in the power distribution network, for example, 1000000 for this embodiment. $s_{ij}^{i,xy} \in \{0,1\}$ represents a status of a switch close to the node i in the branch ij when the fault occurs in the branch xy, $s_{ij}^{i,xy}=1$ represents that the switch is on, and $s_{ij}^{i,xy}=0$ represents that the switch is off. $s_{ij}^{j,xy} \in \{0,1\}$ represents a status of a switch close to the node j in the branch ij when the fault occurs in the branch xy, $s_{ij}^{j,xy}=1$ represents that the switch is on, and $s_{ij}^{j,xy}=0$ represents that the switch is off. $P_{ij}^C$ represents a rated transmission capacity of the branch ij.

2-2-3) A transformer power constraint is determined, and denoted as:

$$P_f^{xy} = P_{tr^f}^{xy}, \forall f \in \Psi^F, tr^f \in Y, \forall xy \in Y \tag{7}$$

$$P_f^{xy} \leq P_f^C, \forall f \in \Psi^F, \forall xy \in Y \tag{8}$$

Where, $P_f^{xy}$ represents a power of a transformer f when the fault occurs in the branch xy, $P_{tr^f}^{xy}$ represents a power of a branch $tr^f$ coupled to the transformer f and flowing from a transformer node to a downstream node when the fault occurs in the branch xy, and $\Psi^F$ represents a collection of all transformer nodes.

2-2-4) A circuit breaker action constraint is determined, and denoted as:

$$F_{xy}^{xy,B} = 0 \tag{9}$$

$$-(1-s_{ij}^{i,NO})M + F_i^{xy,B} \leq F_{ij}^{xy,B} \leq (1-s_{ij}^{i,NO})M + F_i^{xy,B}, \tag{10}$$
$$\forall ij \in \Upsilon_i^S, ij \notin \Upsilon_i^B$$

$$-(1-s_{ij}^{j,NO})M + F_j^{xy,B} \leq F_{ij}^{xy,B} \leq (1-s_{ij}^{j,NO})M + F_j^{xy,B}, \tag{11}$$
$$\forall ij \in \Upsilon_j^S, ij \notin \Upsilon_j^B$$

$$-(1-b_{ij}^{i,xy})M + F_i^{xy,B} \leq F_{ij}^{xy,B} \leq (1-b_{ij}^{i,xy})M + F_i^{xy,B} \forall ij \in \Upsilon_i^B \tag{12}$$

$$-(1-b_{ij}^{j,xy})M + F_j^{xy,B} \leq F_{ij}^{xy,B} \leq (1-b_{ij}^{j,xy})M + F_j^{xy,B} \forall ij \in \Upsilon_j^B \tag{13}$$

$$F_{ij}^{xy,B} = F_i^{xy,B}, \forall ij \notin -\Upsilon_i^S, ij \notin -\Upsilon_i^B \tag{14}$$

$$F_{ij}^{xy,B} = F_j^{xy,B}, \forall ij \notin \Upsilon_j^S, ij \notin \Upsilon_j^B \tag{15}$$

$$\sum_{ij \in \Upsilon_i^B} b_{ij}^{i,NO} + \sum_{ij \in \Upsilon_i^B} b_{ij}^{j,NO} - 1 = \sum_{ij \in \Upsilon_i^B} b_{ij}^{i,xy} + \sum_{ij \in \Upsilon_j^B} b_{ij}^{j,xy} \tag{16}$$

$$0 \leq F_i^{xy,B} \leq 1, \forall i \in \Psi^{LN} \tag{17}$$

$$0 \leq F_{ij}^{xy,B} \leq 1, \forall ij \in \Upsilon \tag{18}$$

-continued $$F_i^{xy,B} = 1, \forall i \in \Psi^{SS} \tag{19}$$

$$p_i^{xy} = 1 - F_i^{xy,B}, \forall i \in \Psi^{LN} \tag{20}$$

$$\forall xy \in \Upsilon$$

Where, a superscript B represents the circuit breaker action stage, $F_{ij}^{xy,B}$ represents a fault-affect mark of the branch ij in the circuit breaker action stage when the fault occurs in the branch xy, $F_{ij}^{xy,B}=0$ represents that the branch ij is affected by the fault and is in a power-off status in the circuit breaker action stage when the fault occurs in the branch xy, $F_{ij}^{xy,B}=1$ represents that the branch ij is in a normal operating status in the circuit breaker action stage when the fault occurs in the branch xy. $F_i^{xy,B}$ represents a fault-affect mark of the node i in the circuit breaker action stage when the fault occurs in the branch xy, $F_i^{xy,B}=0$ represents that the node i is affected by the fault and is in a power-off status in the circuit breaker action stage when the fault occurs in the branch xy, $F_i^{xy,B}=1$ represents that the node i is in a normal operating status in the circuit breaker action stage when the fault occurs in the branch xy. $F_j^{xy,B}$ represents a fault-affect mark of a node j in the circuit breaker action stage when a fault occurs in the branch xy, $F_j^{xy,B}=0$ represents that a node j is affected by the fault and is in a power-off status in the circuit breaker action stage when the fault occurs in the branch xy, $F_j^{xy,B}=1$ represents that the node j is in a normal operating status in the circuit breaker action stage when the fault occurs in the branch xy; $\Psi^{SS}$ represents a collection of nodes with substations; $Y_I^S$ represents a collection of all branches with a switch close to the node I; $Y_J^S$ represents a collection of all branches with a switch close to the node J; $Y_I^B$ represents a collection of all branches with a circuit breaker close to the node I; $Y_J^B$ represents a collection of all branches with a circuit breaker close to the node J, $p_i^{xy}$ represents a net injection power of the node i when the fault occurs in the branch xy.

A superscript NO represents the normal operating status, $s_{ij}^{i,NO}$ represents a status of a switch close to the node i in the branch ij in a normal operating status, $s_{ij}^{i,NO}=1$ represents that the switch is on, and $s_{ij}^{i,NO}=0$ represents that the switch is off. $s_{ij}^{j,NO}$ represents a status of a switch close to the node j in the branch ij in a normal operating status, $s_{ij}^{j,NO}=1$ represents that the switch is on, and $s_{ij}^{j,NO}=0$ represents that the switch is off;

$b_{ij}^{i,xy}$ represents a status of a circuit breaker close to the node i in the branch ij when the fault occurs in the branch xy, $b_{ij}^{i,xy}=1$ represents that the circuit breaker is activated, $b_{ij}^{i,xy}=0$ represents that the circuit breaker is deactivated. $b_{ij}^{j,xy}$ represents a status of a circuit breaker close to the node j in the branch ij when the fault occurs in the branch xy, $b_{ij}^{j,xy}=1$ represents that the circuit breaker is activated, $b_{ij}^{j,xy}=0$ represents that the circuit breaker is deactivated. $b_{ij}^{i,NO}$ represents a status of the circuit breaker close to the node i in the branch ij under a normal operating status, $b_{ij}^{i,NO}=1$ represents that the circuit breaker is activated, $b_{ij}^{i,NO}=0$ represents that the circuit breaker is deactivated. $b_{ij}^{j,NO}$ represents a status of the circuit breaker close to the node j in the branch ij under a normal operating status, $b_{ij}^{j,NO}=1$ represents that the circuit breaker is activated, $b_{ij}^{j,NO}=0$ represents that the circuit breaker is deactivated.

$p_i^{xy}$ represents a fault-influence mark of the node i when the fault occurs in the branch xy, $p_i^{xy}=1$ represents that the node i is influenced by the fault when the fault occurs in the branch xy, $p_i^{xy}=0$ represents that the node i is not influenced by the fault when the fault occurs in the branch xy.

2-2-5) A switch action constraint is determined, and denoted as:

$$F_{xy}^{xy,PF}=0 \tag{21}$$

$$-(1-s_{ij}^{i,xy})M+F_i^{xy,PF} \leq F_{ij}^{xy,PF} \leq (1-s_{ij}^{i,xy})M+F_i^{xy,PF}, \forall ij \in Y_i^S \tag{22}$$

$$-(1-s_{ij}^{j,xy})M+F_j^{xy,PF} \leq F_{ij}^{xy,PF} \leq (1-s_{ij}^{j,xy})M+F_j^{xy,PF}, \forall ij \in Y_j^S \tag{23}$$

$$F_{ij}^{xy,PF}=F_i^{xy,PF}, \forall ij \notin Y_i^S \tag{24}$$

$$F_{ij}^{xy,PF}=F_j^{xy,PF}, \forall ij \notin Y_j^S \tag{25}$$

$$0 \leq F_i^{xy,PF} \leq 1, \forall i \in Y^{LN} \tag{26}$$

$$0 \leq F_{ij}^{xy,PF} \leq 1, \forall ij \in Y \tag{27}$$

$$F_i^{xy,PF}=1, \forall ij \in \Psi^{SS} \tag{28}$$

$$D_i^{xy}=D_i q_i^{xy}, \forall i \in \Psi^{LN} \tag{29}$$

$$q_i^{xy}=F_i^{xy,P}, \forall i \in \Psi^{LN} \tag{30}$$

$$1-p_i^{xy} \leq q_i^{xy}, \forall i \in \Psi^{LN} \tag{31}$$

$$\forall xy \in Y$$

where, a superscript PF represents the switch action stage, $F_{ij}^{xy,PF}$ represents a maintenance-influence mark of the branch ij in the switch action stage when the fault occurs in the branch xy, $F_{ij}^{xy,PF}=0$ represents that the branch ij is influenced by maintenance of the faulty branch and is in a power-off status in the switch action stage when the fault occurs in the branch xy, and $F_{ij}^{xy,PF}=1$ represents that the branch ij is not influenced by the maintenance of the faulty branch and is in a normal operating status in the switch action stage when the fault occurs in the branch xy. $F_i^{xy,PF}$ represents a maintenance-influence mark of the node i in the switch action stage when the fault occurs in the branch xy, $F_i^{xy,PF}=0$ represents that the node i is influenced by maintenance of the faulty branch and is in a power-off status in the switch action stage when the fault occurs in the branch xy, and $F_i^{xy,PF}=1$ represents that the node i is not influenced by the maintenance of the faulty branch and is in a normal operating status in the switch action stage when the fault occurs in the branch xy. $F_j^{xy,PF}$ represents a maintenance-influence mark of a node j in the switch action stage when a fault occurs in the branch xy, $F_j^{xy,PF}=0$ represents that the node j is influenced by maintenance of the faulty branch and is in a power-off status in the switch action stage when the fault occurs in the branch xy, $F_j^{xy,PF}=1$ represents that the node j is not influenced by the maintenance of the faulty branch and is in a normal operating status in the switch action stage when the fault occurs in the branch xy; $s_{ij}^{i,xy} \in \{0,1\}$ represents a status of a switch close to a node i in a branch ij when a fault occurs in a branch xy, $s_{ij}^{i,xy}=1$ represents that the status of the switch is on, and $s_{ij}^{i,xy}=0$ represents that the status of the switch is off, $s_{ij}^{j,xy} \in \{0,1\}$ represents a status of a switch close to a node j in the branch ij when the fault occurs in the branch xy, $s_{ij}^{j,xy}=1$ represents that the status of the switch is on, $s_{ij}^{j,xy}=0$ represents that the status of the switch is off; $D_i^{xy}$ represents a load of a node i when the fault occurs in the branch xy; $D_i$ represents a load of a node i under normal state.

$q_i^{xy}$ represents a status mark of the node i after that the fault occurs in the branch xy (after the switch action stage), $q_i^{xy}=1$ represents that the node i is normally powered after that the fault occurs in the branch xy (after the switch action stage), and $q_i^{xy}=0$ represents that the node i is in a power-off status after that the fault occurs in the branch xy (after the switch action stage).

2-2-6) A reliability index calculation constraint is determined, and denoted as:

$$CID_i = \sum_{xy \notin \Upsilon} \lambda_{xy} \tau_{xy}^{SW} p_i^{xy} + \sum_{xy \notin \Upsilon} \lambda_{xy}(\tau_{xy}^{RP} - \tau_{xy}^{SW})(1 - q_i^{xy}), \forall i \in \Psi^{LN} \quad (32)$$

$$CIF_j = \sum_{xy \notin \Upsilon} \lambda_{xy} p_i^{xy}, \forall i \in \Psi^{LN} \quad (33)$$

$$SAIDI = \frac{\sum_{i \in \Psi^{LN}} NC_i CID_i}{\sum_{i \in \Psi^{LN}} NC_i} \quad (34)$$

$$SAIFI = \frac{\sum_{i \in \Psi^{LN}} NC_i CIF_i}{\sum_{i \in \Psi^{LN}} NC_i} \quad (35)$$

$$ASAI = 1 - \frac{SAIDI}{8760} \quad (36)$$

$$EENS = \sum_{h \in B} \frac{\Delta_h}{8760} \sum_{i \in \Psi^{LN}} CID_i \mu_h L_i \quad (37)$$

Where, $CID_i$ represents a customer interruption duration of the node i. $\lambda_{xy}$ represents an annual fault rate of the branch xy (if xy=tr$^f$, f∈Ψ$^F$, the branch xy represents the transformer f). $\tau_{xy}^{SW}$ represents an interruption period of fault isolation action of the branch xy (if xy=tr$^f$, f∈Ψ$^F$, the branch xy represents the transformer f), for example, a period from a fault occurrence to the switch action of the branch fault, $\tau_{xy}^{RP}$ represents an interruption period of fault repair of the branch xy (if xy=tr$^f$, f∈Ψ$^F$, the branch xy represents the transformer f), for example, a period from the fault occurrence to a time point when the fault is repaired. $CIF_i$ represents a customer interruption frequency of the node i, $NC_i$ represents a given number of customers of the node i, SAIEI represents a system average interruption frequency index, SAIDI represents a system average interruption duration index, ASAI represents a system average service availability index, EENS represents an expected energy not supplied, B represents a collection of all load levels, $\Delta_h$ represents a number of hours lasted per year for a load level h, $\mu_h \leq 1$ represents a peak load ratio of the level h, and $L_i$ represents a peak load of the node i.

3) The model for optimizing reliability indexes of a power distribution network is solved based on the objective function (1) and the constraint conditions (2)-(37) through optimization software such as CPLEX or gurobi, to obtain the reliability indexes of the power distribution network: $CID_i$, $CIF_i$, SAIDI, SAIFI, ASAI, and EENS.

With the above results, the reliability of the power distribution network may be obtained accurately, which may be used to perform system reliability index analysis, user node reliability analysis, and feeder reliability analysis, and further used to perform bad index analysis. Based on the analysis results, the weak link analysis of power supply may be performed according to the actual reliability requirements of the power distribution network, improving the operation of the power distribution network.

With the present disclosure, the calculation of the reliability indexes of the power distribution network is modeled as a mixed integer linear programming problem, and the values of the reliability indexes are directly obtained by solving the model, thus a large number of sampling calculations in the reliability evaluation of the power distribution network are avoided. With this method, the installation positions of circuit breakers and switches may be accurately described, and the restoration of part of the loads affected by the fault through network reconstruction after a fault is considered, accuracy of index calculation results may be improved, thus improving the efficiency of reliability evaluation of the power distribution network.

Figure 2:
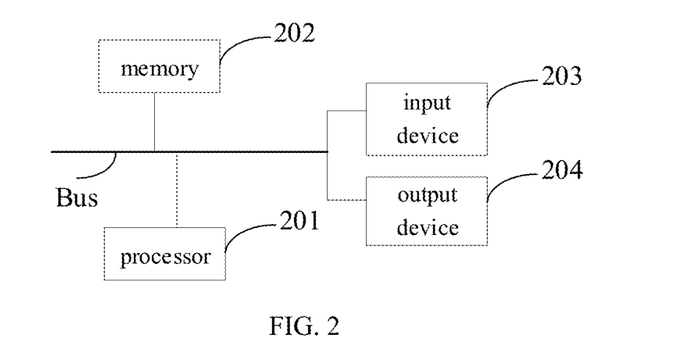
FIG. 2 is a block diagram a power distribution network reliability index calculation apparatus based on mixed integer linear programming according to an embodiment of the present disclosure.

FIG. 2 is a block diagram of a computer for implementing the above method according to some embodiments of the disclosure. The computers are intended to represent various forms of digital computers, such as laptop computers, desktop computers, workbenches, personal digital assistants, mainframe computers, and other suitable computers. The computers may also represent various forms of mobile devices, such as personal digital processing, cellular phones, smart phones, wearable devices, and other similar computing devices. The components shown here, their connections and relations, and their functions are merely examples, and are not intended to limit to the implementation of the disclosure described and/or required herein.

As illustrated in FIG. 2, the computer includes: one or more processors 201, a memory 202, and interfaces for connecting various components, including high-speed interfaces and low-speed interfaces. The various components are interconnected using different buses and can be mounted on a common mainboard or otherwise installed as required. The processor may process instructions executed within the computer, including instructions stored in the memory or on the memory to display graphical information of the GUI (Graphical User Interface) on an external input/output device such as a display device coupled to the interface. In other embodiments, a plurality of processors and/or buses can be used with a plurality of memories and processors, if desired. Similarly, a plurality of computers can be connected, each providing some of the necessary operations. A processor 201 is taken as an example in FIG. 2.

The memory 202 is a non-transitory computer-readable storage medium according to the disclosure. The memory stores instructions executable by at least one processor, so that the at least one processor executes the above method. The non-transitory computer-readable storage medium of the disclosure stores computer instructions that are configured to cause a computer to execute the method (the method as illustrated in FIG. 1).

As the non-transitory computer-readable storage medium, the memory 202 is configured to store non-transitory software programs, non-transitory computer executable programs and modules, such as program instructions/modules corresponding to the above method. The processor 201 executes various functional applications and data processing of the computer by running non-transitory software programs, instructions, and modules stored in the memory 202, that is, implementing the above method in the foregoing embodiment of FIG. 1.

The memory 202 may include a storage program area and a storage data area, where the storage program area may store an operating system and application programs required for at least one function. The storage data area may store data created according to the use of the computer, and the like. In addition, the memory 202 may include a high-speed random-access memory, and a non-transitory memory, such as at least one magnetic disk storage device, a flash memory device, or other non-transitory solid-state storage device. In some embodiments, the memory 202 may optionally include a memory remotely disposed with respect to the processor 201, and these remote memories may be connected to the computer through a network. Examples of the above network include, but are not limited to, the Internet, an intranet, a local area network, a mobile communication network, and combinations thereof.

The computer may further include an input device 203 and an output device 204. The processor 201, the memory 202, the input device 203, and the output device 204 may be connected through a bus or in other manners. In FIG. 2, the connection through the bus is taken as an example.

The input device 203 may receive inputted numeric or character information, and generate key signal inputs related to user settings and function control of the computer, such as a touch screen, a keypad, a mouse, a trackpad, a touchpad, an indication rod, one or more mouse buttons, trackballs, joysticks and other input devices. The output device 204 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein.

The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

What is claimed is:

1. A power distribution network reliability index calculation method based on mixed integer linear programming, comprising:
   determining installation status of components, fault isolation, load transformation supply and action rules of fault recovery when there is a branch fault of the power distribution network, wherein the components include circuit breakers and switches installed at the end of each branch, which are used to isolate the faulty branch circuits and reconfigure the network after a branch circuit failure, and to recover the original power supply network structure after the faulty branch is repaired;
   establishing a model for optimizing reliability indexes of a power distribution network based on a mixed integer linear programming model, wherein the model comprises an objective function and constraint conditions, the objective function is for minimizing a system average interruption duration index (SAIDI);
   solving the model based on the objective function and the constraint conditions to obtain reliability indexes of the power distribution network; and
   determining the reliability of the power distribution network based on the reliability indexes, and controlling operation of the power distribution network based on the reliability indexes;

wherein establishing the model for optimizing reliability indexes of the power distribution network based on the mixed integer linear programming model comprises:
determining the objective function; and
determining the constraint conditions;
wherein the constraint conditions comprise a reliability index calculation constraint;
wherein the reliability index calculation constraint is determined by:

$$CID_i = \sum_{xy \in \Upsilon} \lambda_{xy} \tau_{xy}^{SW} p_i^{xy} + \sum_{xy \in \Upsilon} \lambda_{xy} (\tau_{xy}^{RP} - \tau_{xy}^{SW})(1 - q_i^{xy}), \forall i \in \Psi^{LN}$$

$$CIF_i = \sum_{xy \in \Upsilon} \lambda_{xy} p_i^{xy}, \forall i \in \Psi^{LN}$$

$$SAIDI = \frac{\sum_{i \in \Psi^{LN}} NC_i CID_i}{\sum_{i \in \Psi^{LN}} NC_i}$$

$$SAIFI = \frac{\sum_{i \in \Psi^{LN}} NC_i CIF_i}{\sum_{i \in \Psi^{LN}} NC_i}$$

$$ASAI = 1 - \frac{SAIDI}{8760}$$

$$EENS = \sum_{h \in B} \frac{\Delta_h}{8760} \sum_{i \in \Psi^{LN}} CID_i \mu_h L_i$$

where, $CID_i$ represents a customer interruption duration of a node i, $\lambda_{xy}$ represents an annual fault rate of a branch xy, $\tau_{xy}^{SW}$ represents an interruption period of fault isolation action of the branch xy, $\tau_{xy}^{RP}$ represents an interruption period of fault restore of the branch xy, $CIF_i$ represents a customer interruption frequency of the node i, $NC_i$ represents a given number of customers of the node i, SAIDI represents a system average interruption duration index, SAIFI represents a system average interruption frequency index, ASAI represents a system average service availability index, EENS represents an expected energy not supplied, B represents a collection of all load levels, $\Delta_h$ represents a number of hours lasted per year for a load level h, $\mu_h \leq 1$ represents a peak load ratio of the level h, and $L_i$ represents a peak load ratio of the node i.

2. The method according to claim 1, wherein the constraint conditions further comprises at least one of a power balance constraint of the power distribution network, a branch power constraint, a transformer power constraint, a circuit breaker action constraint, and a switch action constraint.

3. The method according to claim 2, wherein the power balance constraint is determined by:

$$D_i^{xy} = \sum_{j \in \Psi_i} P_{ji}^{xy}, \forall i \in \Psi^{LN}, \forall xy \in \Upsilon$$

$$P_{ij}^{xy} = -P_{ji}^{xy}, \forall ij \in \Upsilon, \forall xy \in \Upsilon$$

where, a superscript xy represents a scenario where a fault occurs in a branch xy, $D_i^{xy}$ represents a load of a node i when the fault occurs in the branch xy, $P_{ji}^{xy}$ represents a power of a branch ij flowing from a node j to the node i when the fault occurs in the branch xy, $P_{ij}^{xy}$ represents a power of a branch ij flowing from the node i to the node j when the fault occurs in the branch xy, $\Psi_i$ represents a collection of branches directly coupled to the node i, $\Psi^{LN}$ represents a collection of nodes having loads, Y represents a collection of all branches, and $\forall xy \in \Upsilon$ represents all branch fault scenarios.

4. The method according to claim 2, wherein, the branch power constraint is determined by:

$$-Ms_{ij}^{i,xy} \leq P_{ij}^{xy} \leq Ms_{ij}^{i,xy}, \forall ij \in \Upsilon, \forall xy \in \Upsilon$$

$$-Ms_{ij}^{j,xy} \leq P_{ij}^{xy} \leq Ms_{ij}^{j,xy}, \forall ij \in \Upsilon, \forall xy \in \Upsilon$$

$$-P_{ij}^C \leq P_{ij}^{xy} \leq P_{ij}^C, \forall ij \in \Upsilon, \forall xy \in \Upsilon$$

where, M is a positive integer, $s_{ij}^{i,xy} \in \{0,1\}$ represents a status of a switch close to a node i in a branch ij when a fault occurs in a branch xy, $s_{ij}^{i,xy}=1$ represents that the status of the switch is on, and $s_{ij}^{i,xy}=0$ represents that the status of the switch is off, $s_{ij}^{j,xy} \in \{0,1\}$ represents a status of a switch close to a node j in the branch ij when the fault occurs in the branch xy, $s_{ij}^{j,xy}=1$ represents that the status of the switch is on, $s_{ij}^{j,xy}=0$ represents that the status of the switch is off, $P_{ij}^C$ represents a rated transmission capacity of the branch ij.

5. The method according to claim 2, wherein, the transformer power constraint is determined by:

$$P_f^{xy} = P_{tr_f}^{xy}, \forall f \in \Psi^F, tr^f \in \Upsilon, \forall xy \in \Upsilon$$

$$P_f^{xy} \leq P_f^C, \forall f \in \Psi^F, \forall xy \in \Upsilon$$

where, $P_f^{xy}$ represents a power of a transformer f when a fault occurs in a branch xy, $P_{tr_f}^{xy}$ represents a power from a transformer node to a downstream node of a branch $tr^f$ coupled to the transformer f when the fault occurs in the branch xy, $\Psi^F$ represents a collection of all transformer nodes.

6. The method according to claim 2, wherein, the circuit breaker action constraint is determined by:

$$F_{xy}^{xy,B} = 0$$

$$-(1 - s_{ij}^{i,NO})M + F_i^{xy,B} \leq F_{ij}^{xy,B} \leq (1 - s_{ij}^{i,NO})M + F_i^{xy,B},$$
$$\forall ij \in \Upsilon_I^S, ij \notin \Upsilon_I^B$$

$$-(1 - s_{ij}^{j,NO})M + F_j^{xy,B} \leq F_{ij}^{xy,B} \leq (1 - s_{ij}^{j,NO})M + F_j^{xy,B}, \forall ij \in \Upsilon_J^S, ij \notin \Upsilon_J^B$$

$$-(1 - b_{ij}^{i,xy})M + F_i^{xy,B} \leq F_{ij}^{xy,B} \leq (1 - b_{ij}^{i,xy})M + F_i^{xy,B}, \forall ij \in \Upsilon_I^B$$

$$-(1 - b_{ij}^{j,xy})M + F_j^{xy,B} \leq F_{ij}^{xy,B} \leq (1 - b_{ij}^{j,xy})M + F_j^{xy,B}, \forall ij \in \Upsilon_J^B$$

$$F_{ij}^{xy,B} = F_i^{xy,B}, \forall ij \notin \Upsilon_I^S, ij \notin \Upsilon_I^B$$

$$F_{ij}^{xy,B} = F_j^{xy,B}, \forall ij \notin \Upsilon_J^S, ij \notin \Upsilon_J^B$$

$$\sum_{ij \in \Upsilon_i^B} b_{ij}^{i,NO} + \sum_{ij \in \Upsilon_j^B} b_{ij}^{j,NO} - 1 = \sum_{ij \in \Upsilon_i^B} b_{ij}^{i,xy} + \sum_{ij \in \Upsilon_j^B} b_{ij}^{j,xy}$$

$$0 \leq F_i^{xy,B} \leq 1, \forall i \in \Psi^{LN}$$

$$0 \leq F_{ij}^{xy,B} \leq 1, \forall ij \in \Upsilon$$

$$F_i^{xy,B} = 1, \forall i \in \Psi^{SS}$$

$$p_i^{xy} = 1 - F_i^{xy,B}, \forall i \in \Psi^{LN}$$

$$\forall xy \in \Upsilon$$

where, a superscript B represents a circuit breaker action stage, a circuit breaker closest to a faulty branch at upstream of the faulty branch is activated to interrupt faulty current in the circuit breaker action stage, $F_{ij}^{xy,B}$ represents a fault-affect mark of a branch ij in the circuit breaker action stage when the fault occurs in a branch xy, $F_{ij}^{xy,B}=0$ represents that the branch ij is affected by the fault and is in a power-off status in the circuit breaker action stage when the fault occurs in the branch xy, $F_{ij}^{xy,B}=1$ represents that the branch ij is in a normal operating status in the circuit breaker action stage when the fault occurs in the branch xy, $F_i^{xy,B}$ represents a fault-affect mark of a node i in the circuit breaker action stage when a fault occurs in the branch xy, $F_i^{xy,B}=0$ represents that the node i is affected by the fault and is in a power-off status in the circuit breaker action stage when the fault occurs in the branch xy, $F_i^{xy,B}=1$ represents that the node i is in a normal operating status in the circuit breaker action stage when the fault occurs in the branch xy, $F_j^{xy,B}$ represents a fault-affect mark of a node j in the circuit breaker action stage when a fault occurs in the branch xy, $F_j^{xy,B}=0$ represents that a node j is affected by the fault and is in a power-off status in the circuit breaker action stage when the fault occurs in the branch xy, $F_j^{xy,B}=1$ represents that the node j is in a normal operating status in the circuit breaker action stage when the fault occurs in the branch xy; $\Psi^{ss}$ represents a collection of nodes with substations; $Y_I^S$ represents a collection of all branches with a switch close to the node I; $Y_J^S$ represents a collection of all branches with a switch close to the node J; $Y_I^B$ represents a collection of all branches with a circuit breaker close to the node I; $Y_J^B$ represents a collection of all branches with a circuit breaker close to the node J, $P_i^{xy}$ represents a net injection power of the node i when the fault occurs in the branch xy; a superscript NO represents the normal operating status, $s_{ij}^{i,NO}$ represents a status of a switch close to the node i in the branch ij in a normal operating status, $s_{ij}^{i,NO}=1$ represents that the switch is on, $s_{ij}^{i,NO}=0$ represents that the switch is off, $s_{ij}^{j,NO}$ represents a status of a switch close to the node j in the branch ij in a normal operating status, $s_{ij}^{j,NO}=1$ represents that the switch is on, and $s_{ij}^{j,NO}=0$ represents that the switch is off; $b_{ij}^{i,xy}$ represents a status of a circuit breaker close to the node i in the branch ij when the fault occurs in the branch xy, $b_{ij}^{i,xy}=1$ represents that the circuit breaker is activated, $b_{ij}^{i,xy}=0$ represents that the circuit breaker is deactivated, $b_{ij}^{j,xy}$ represents a status of a circuit breaker close to the node j in the branch ij when the fault occurs in the branch xy, $b_{ij}^{j,xy}=1$ represents that the circuit breaker is activated, $b_{ij}^{j,xy}=0$ represents that the circuit breaker is deactivated, $b_{ij}^{i,NO}$ represents a status of the circuit breaker close to the node i in the branch ij under a normal operating status, $b_{ij}^{i,NO}=1$ represents that the circuit breaker is activated, $b_{ij}^{i,NO}=0$ represents that the circuit breaker is deactivated, $b_{ij}^{j,NO}$ represents a status of the circuit breaker close to the node j in the branch ij under a normal operating status, $b_{ij}^{j,NO}=1$ represents that the circuit breaker is activated, $b_{ij}^{j,NO}=0$ represents that the circuit breaker is deactivated;
$p_i^{xy}$ represents a fault-influence marker of the node i when the fault occurs in the branch xy, $p_i^{xy}=1$ represents that the node i is influenced by the fault when the fault occurs in the branch xy, $p_i^{xy}=0$ represents that the node i is not influenced by the fault when the fault occurs in the branch xy.

7. The method according to claim 2, wherein the switch action constraint is determined by:

$$F_{xy}^{xy,B} = 0$$

$$-(1 - s_{ij}^{i,NO})M + F_i^{xy,B} \leq F_{ij}^{xy,B} \leq (1 - s_{ij}^{i,NO})M + F_i^{xy,B},$$
$$\forall ij \in Y_I^S, ij \notin Y_I^B$$

$$-(1 - s_{ij}^{j,NO})M + F_j^{xy,B} \leq F_{ij}^{xy,B} \leq (1 - s_{ij}^{j,NO})M + F_j^{xy,B}, \forall ij \in Y_J^S, ij \notin Y_J^B$$

$$-(1 - b_{ij}^{i,xy})M + F_i^{xy,B} \leq F_{ij}^{xy,B} \leq (1 - b_{ij}^{i,xy})M + F_i^{xy,B} \forall ij \in -Y_I^B$$

$$-(1 - b_{ij}^{i,xy})M + F_j^{xy,B} \leq F_{ij}^{xy,B} \leq (1 - b_{ij}^{i,xy})M + F_j^{xy,B}, \forall ij \in Y_J^B$$

$$F_{ij}^{xy,B} = F_i^{xy,B}, \forall ij \notin Y_I^S, ij \notin Y_I^B$$

$$F_{ij}^{xy,B} = F_j^{xy,B}, \forall ij \notin Y_J^S, ij \notin Y_J^B$$

$$\sum_{ij \in Y_I^B} b_{ij}^{i,NO} + \sum_{ij \in Y_J^B} b_{ij}^{j,NO} - 1 = \sum_{ij \in Y_I^B} b_{ij}^{i,xy} + \sum_{ij \in Y_J^B} b_{ij}^{i,xy}$$

$$0 \leq F_i^{xy,B} \leq 1, \forall i \in \Psi^{LN}$$

$$0 \leq F_{ij}^{xy,B} \leq 1, \forall ij \in Y$$

$$F_i^{xy,B} = 1, \forall i \in \Psi^{SS}$$

$$p_i^{xy} = 1 - F_i^{xy,B}, \forall i \in \Psi^{LN}$$

$$\forall xy \in Y$$

where, a superscript PF represents a switch action stage, a faulty branch is isolated in the switch action stage, $F_{ij}^{xy,PF}$ represents a maintenance-influence mark of a branch ij in the switch action stage when a fault occurs in a branch xy, $F_{ij}^{xy,PF}=0$ represents that the branch ij is influenced by maintenance of the faulty branch and is in a power-off status in the switch action stage when the fault occurs in the branch xy, $F_{ij}^{xy,PF}=1$ represents that the branch ij is not influenced by the maintenance of the faulty branch and is in a normal operating status in the switch action stage when the fault occurs in the branch xy, $F_i^{xy,PF}$ represents a maintenance-influence mark of a node i in the switch action stage when a fault occurs in the branch xy, $F_i^{xy,PF}=0$ represents that the node i is influenced by maintenance of the faulty branch and is in a power-off status in the switch action stage when the fault occurs in the branch xy, $F_i^{xy,PF}=1$ represents that the node i is not influenced by the maintenance of the faulty branch and is in a normal operating status in the switch action stage when the fault occurs in the branch xy; $F_j^{xy,PF}$ represents a maintenance-influence mark of a node j in the switch action stage when a fault occurs in the branch xy, $F_j^{xy,PF}=0$ represents that the node j is influenced by maintenance of the faulty branch and is in a power-off status in the switch action stage when the fault occurs in the branch xy, $F_j^{xy,PF}=1$ represents that the node j is not influenced by the maintenance of the faulty branch and is in a normal operating status in the switch action stage when the fault occurs in the branch xy; $s_{ij}^{i,xy} \in \{0, 1\}$ represents a status of a switch close to a node i in a branch ij when a fault occurs in a branch xy, $s_{ij}^{i,xy}=1$ represents that the status of the switch is on, and $s_{ij}^{i,xy}=0$ represents that the status of the switch is off, $s_{ij}^{j,xy} \in \{0,1\}$ represents a status of a switch close to a node j in the branch ij when the fault occurs in the branch xy, $s_{ij}^{j,xy}=1$ represents that the status of the switch is on, $s_{ij}^{j,xy}=0$ represents that the status of the switch is off; $D_i^{xy}$ represents a load of a node i when the fault occurs in the branch xy; $D_i$ represents a load of a node i under normal state;

$q_i^{xy}$ represents a status mark of the node i after the switch action stage and after that the fault occurs in the branch xy, $q_i^{xy}=1$ represents that the node i is normally powered after the switch action stage and after that the fault occurs in the branch xy, $q_i^{xy}=0$ represents that the node i is in a power-off status after the switch action stage and after that the fault occurs in the branch xy.

8. The method according to claim 1, wherein the power distribution network reliability indexes comprise the $CID_i$, $CIF_i$, SAIDI, SAIFI, ASAI, and EENS.

9. A power distribution network reliability index calculation apparatus based on mixed integer linear programming, comprising:
a processor; and
a memory for storing instructions executable by the processor;
wherein the processor is configured to perform:
  determining installation status of components, fault isolation, load transformation supply and action rules of fault recovery when there is a branch fault of the power distribution network, wherein the components include circuit breakers and switches installed at the end of each branch, which are used to isolate the faulty branch circuits and reconfigure the network after a branch circuit failure, and to recover the original power supply network structure after the faulty branch is repaired;
  establishing a model for optimizing reliability indexes of a power distribution network based on a mixed integer linear programming model, wherein the model comprises an objective function and constraint conditions, the objective function is for minimizing a system average interruption duration index (SAIDI);
  solving the model based on the objective function and the constraint conditions to obtain reliability indexes of the power distribution network; and
  determining the reliability of the power distribution network based on the reliability indexes, and controlling operation of the power distribution network based on the reliability indexes;
wherein the constraint conditions comprise a reliability index calculation constraint;
wherein the reliability index calculation constraint is determined by:

$$CID_i = \sum_{xy \in \Upsilon} \lambda_{xy} \tau_{xy}^{SW} p_i^{xy} + \sum_{xy \in \Upsilon} \lambda_{xy}(\tau_{xy}^{RP} - \tau_{xy}^{SW})(1 - q_i^{xy}), \forall i \in \Psi^{LN}$$

$$CIF_i = \sum_{xy \in \Upsilon} \lambda_{xy} p_i^{xy}, \forall i \in \Psi^{LN}$$

$$SAIDI = \frac{\sum_{i \in \Psi^{LN}} NC_i CID_i}{\sum_{i \in \Psi^{LN}} NC_i}$$

$$SAIFI = \frac{\sum_{i \in \Psi^{LN}} NC_i CIF_i}{\sum_{i \in \Psi^{LN}} NC_i}$$

$$ASAI = 1 - \frac{SAIDI}{8760}$$

$$EENS = \sum_{h \in B} \frac{\Delta_h}{8760} \sum_{i \in \Psi^{LN}} CID_i \mu_h L_i$$

where, $CID_i$ represents a customer interruption duration of a node i, $\lambda_{xy}$ represents an annual fault rate of a branch xy, $\tau_{xy}^{SW}$ represents an interruption period of fault isolation action of the branch xy, $\tau_{xy}^{RP}$ represents an interruption period of fault restore of the branch xy, $CIF_i$ represents a customer interruption frequency of the node i, $NC_i$ represents a given number of customers of the node i, SAIDI represents a system average interruption duration index, SAIFI represents a system average interruption frequency index, ASAI represents a system average service availability index, EENS represents an expected energy not supplied, B represents a collection of all load levels, $\Delta_h$ represents a number of hours lasted per year for a load level h, $\mu_h \leq 1$ represents a peak load ratio of the level h, and $L_i$ represents a peak load ratio of the node i.

10. The apparatus according to claim 9, wherein the constraint conditions further comprises at least one of a power balance constraint of the power distribution network, a branch power constraint, a transformer power constraint, a circuit breaker action constraint, a switch action constraint.

11. The apparatus according to claim 10, wherein, the power balance constraint is determined by:

$$D_i^{xy} = \sum_{j \in \Psi_i} P_{ji}^{xy}, \forall i \in \Psi^{LN}, \forall xy \in \Upsilon$$

$$P_{ij}^{xy} = -P_{ji}^{xy}, \forall ij \in \Upsilon, \forall xy \in \Upsilon$$

where, a superscript xy represents a scenario where a fault occurs in a branch xy, $D_i^{xy}$ represents a load of a node i when the fault occurs in the branch xy, $P_{ij}^{xy}$ represents a power of a branch ij flowing from a node j to the node i when the fault occurs in the branch xy, $P_{ij}^{xy}$ represents a power of a branch ij flowing from the node i to the node j when the fault occurs in the branch xy, $\Psi_i$ represents a collection of branches directly coupled to the node i, $\Psi^{LN}$ represents a collection of nodes having loads, Y represents a collection of all branches, and $\forall xy \in Y$ represents all branch fault scenarios.

12. The apparatus according to claim 10, wherein, the branch power constraint is determined by:

$$-Ms_{ij}^{i,xy} \leq P_{ij}^{xy} \leq Ms_{ij}^{i,xy}, \forall ij \in Y, \forall xy \in Y$$

$$-Ms_{ij}^{j,xy} \leq P_{ij}^{xy} \leq Ms_{ij}^{j,xy}, \forall ij \in Y, \forall xy \in Y$$

$$-P_{ij}^{C} \leq P_{ij}^{xy} \leq P_{ij}^{C}, \forall ij \in Y, \forall xy \in Y$$

where, M is a positive integer, $s_{ij}^{i,xy} \in \{0,1\}$ represents a status of a switch close to a node i in a branch ij when a fault occurs in a branch xy, $s_{ij}^{i,xy}=1$ represents that the status of the switch is on, and $s_{ij}^{i,xy}=0$ represents that the status of the switch is off, $s_{ij}^{j,xy} \in \{0,1\}$ represents a status of a switch close to a node j in the branch ij when the fault occurs in the branch xy, $s_{ij}^{j,xy}=1$ represents that the status of the switch is on, $s_{ij}^{j,xy}=0$ represents that the status of the switch is off, $P_{ij}^{C}$ represents a rated transmission capacity of the branch ij.

13. The apparatus according to claim 10, wherein, the transformer power constraint is determined by:

$$P_f^{xy} = P_{tr_f}^{xy}, \forall f \in \Psi^F, tr^f \in Y, \forall xy \in Y$$

$$P_f^{xy} \leq P_f^C, \forall f \in \Psi^F, \forall xy \in Y$$

where, $P_f^{xy}$ represents a power of a transformer f when a fault occurs in a branch xy, $P_{tr_f}^{xy}$ represents a power from a transformer node to a downstream node of a branch $tr^f$ coupled to the transformer f when the fault occurs in the branch xy, $\Psi^F$ represents a collection of all transformer nodes.

14. The apparatus according to claim 10, wherein, the circuit breaker action constraint is determined by:

$$F_{xy}^{xy,B} = 0$$

$$-(1-s_{ij}^{i,NO})M + F_i^{xy,B} \leq F_{ij}^{xy,B} \leq (1-s_{ij}^{i,NO})M + F_i^{xy,B}, \forall ij \in \Upsilon_I^S, ij \notin \Upsilon_I^B$$

$$-(1-s_{ij}^{j,NO})M + F_j^{xy,B} \leq F_{ij}^{xy,B} \leq (1-s_{ij}^{j,NO})M + F_j^{xy,B}, \forall ij \in \Upsilon_J^S, ij \notin \Upsilon_J^B$$

$$-(1-b_{ij}^{i,xy})M + F_i^{xy,B} \leq F_{ij}^{xy,B} \leq (1-b_{ij}^{i,xy})M + F_i^{xy,B}, \forall ij \in \Upsilon_I^B$$

$$-(1-b_{ij}^{j,xy})M + F_j^{xy,B} \leq F_{ij}^{xy,B} \leq (1-b_{ij}^{j,xy})M + F_j^{xy,B}, \forall ij \in \Upsilon_J^B$$

$$F_{ij}^{xy,B} = F_i^{xy,B}, \forall ij \notin \Upsilon_I^S, ij \notin \Upsilon_I^B$$

$$F_{ij}^{xy,B} = F_j^{xy,B}, \forall ij \notin \Upsilon_J^S, ij \notin \Upsilon_J^B$$

$$\sum_{ij \in \Upsilon_i^B} b_{ij}^{i,NO} + \sum_{ij \in \Upsilon_j^B} b_{ij}^{j,NO} - 1 = \sum_{ij \in \Upsilon_i^B} b_{ij}^{i,xy} + \sum_{ij \in \Upsilon_j^B} b_{ij}^{j,xy}$$

$$0 \leq F_i^{xy,B} \leq 1, \forall i \in \Psi^{LN}$$

$$0 \leq F_{ij}^{xy,B} \leq 1, \forall ij \in \Upsilon$$

$$F_i^{xy,B} = 1, \forall i \in \Psi^{SS}$$

$$p_i^{xy} = 1 - F_i^{xy,B}, \forall i \in \Psi^{LN}$$

$$\forall xy \in \Upsilon$$

where, a superscript B represents a circuit breaker action stage, a circuit breaker closest to a faulty branch at upstream of the faulty branch is activated to interrupt faulty current in the circuit breaker action stage, $F_{ij}^{xy,B}$ represents a fault-affect mark of a branch ij in the circuit breaker action stage when the fault occurs in a branch xy, $F_{ij}^{xy,B}=0$ represents that the branch ij is affected by the fault and is in a power-off status in the circuit breaker action stage when the fault occurs in the branch xy, $F_{ij}^{xy,B}=1$ represents that the branch ij is in a normal operating status in the circuit breaker action stage when the fault occurs in the branch xy, $F_i^{xy,B}$ represents a fault-affect mark of a node i in the circuit breaker action stage when a fault occurs in the branch xy, $F_i^{xy,B}=0$ represents that the node i is affected by the fault and is in a power-off status in the circuit breaker action stage when the fault occurs in the branch xy, $F_i^{xy,B}=1$ represents that the node i is in a normal operating status in the circuit breaker action stage when the fault occurs in the branch xy, $F_j^{xy,B}$ represents a fault-affect mark of a node j in the circuit breaker action stage when a fault occurs in the branch xy, $F_j^{xy,B}=0$ represents that a node j is affected by the fault and is in a power-off status in the circuit breaker action stage when the fault occurs in the branch xy, $F_j^{xy,B}=1$ represents that the node j is in a normal operating status in the circuit breaker action stage when the fault occurs in the branch xy; $\Psi^{SS}$ represents a collection of nodes with substations; $\Upsilon_I^S$ represents a collection of all branches with a switch close to the node I; $\sigma_J^S$ represents a collection of all branches with a switch close to the node J; $\Upsilon_I^B$ represents a collection of all branches with a circuit breaker close to the node I; $\Upsilon_J^B$ represents a collection of all branches with a circuit breaker close to the node J, $p_i^{xy}$ represents a net injection power of the node i when the fault occurs in the branch xy;

a superscript NO represents the normal operating status, $s_{ij}^{i,NO}$ represents a status of a switch close to the node i in the branch ij in a normal operating status, $s_{ij}^{i,NO}=1$ represents that the switch is on, $s_{ij}^{i,NO}=0$ represents that the switch is off, $s_{ij}^{j,NO}$ represents a status of a switch close to the node j in the branch ij in a normal operating status, $s_{ij}^{j,NO}=1$ represents that the switch is on, and $s_{ij}^{j,NO}=0$ represents that the switch is off;

$b_{ij}^{i,xy}$ represents a status of a circuit breaker close to the node i in the branch ij when the fault occurs in the branch xy, $b_{ij}^{i,xy}=1$ represents that the circuit breaker is activated, $b_{ij}^{i,xy}=0$ represents that the circuit breaker is deactivated, $b_{ij}^{j,xy}$ represents a status of a circuit breaker close to the node j in the branch ij when the fault occurs in the branch xy, $b_{ij}^{j,xy}=1$ represents that the circuit breaker is activated, $b_{ij}^{j,xy}=0$ represents that the circuit breaker is deactivated, $b_{ij}^{i,NO}$ represents a status of the circuit breaker close to the node i in the branch ij under a normal operating status, $b_{ij}^{i,NO}=1$ represents that the circuit breaker is activated, $b_{ij}^{i,NO}=0$ represents that the circuit breaker is deactivated, $b_{ij}^{j,NO}$ represents a status of the circuit breaker close to the node j in the branch ij under a normal operating status, $b_{ij}^{j,NO}=1$ represents that the circuit breaker is activated, $b_{ij}^{j,NO}=0$ represents that the circuit breaker is deactivated;

$p_i^{xy}$ represents a fault-influence marker of the node i when the fault occurs in the branch xy, $p_i^{xy}=1$ represents that the node i is influenced by the fault when the fault occurs in the branch xy, $p_i^{xy}=0$ represents that the node i is not influenced by the fault when the fault occurs in the branch xy.

15. The apparatus according to claim 10, wherein the switch action constraint is determined by:

$$F_{xy}^{xy,PF} = 0$$

$$-(1-s_{ij}^{i,xy})M + F_i^{xy,PF} \leq F_{ij}^{xy,PF} \leq (1-s_{ij}^{i,xy})M + F_i^{xy,PF}, \forall ij \in \Upsilon_I^S$$

$$-(1-s_{ij}^{j,xy})M + F_j^{xy,PF} \leq F_{ij}^{xy,PF} \leq (1-s_{ij}^{j,xy})M + F_j^{xy,PF}, \forall ij \in \Upsilon_J^S$$

$$F_{ij}^{xy,PF} = F_i^{xy,PF}, \forall ij \notin \Upsilon_I^S$$

$$F_{ij}^{xy,PF} = F_j^{xy,PF}, \forall ij \notin \Upsilon_J^S$$

$$0 \leq F_i^{xy,PF} \leq 1, \forall i \in \Psi^{LN}$$

$$0 \leq F_{ij}^{xy,PF} \leq 1, \forall ij \in \Upsilon$$

$$F_i^{xy,PF} = 1, \forall i \in \Psi^{SS}$$

$$D_i^{xy} = D_i q_i^{xy}, \forall i \in \Psi^{LN}$$

$$q_i^{xy} = F_i^{xy,P}, \forall i \in \Psi^{LN}$$

$$1 - p_i^{xy} \leq q_i^{xy}, \forall i \in \Psi^{LN}$$

$$\forall xy \in \Upsilon$$

where, a superscript PF represents a switch action stage, a faulty branch is isolated in the switch action stage, $F_{ij}^{xy,PF}$ represents a maintenance-influence mark of a branch ij in the switch action stage when a fault occurs in a branch xy, $F_{ij}^{xy,PF}=0$ represents that the branch ij is influenced by maintenance of the faulty branch and is in a power-off status in the switch action stage when the fault occurs in the branch xy, $F_{ij}^{xy,PF}=1$ represents that the branch ij is not influenced by the maintenance of the faulty branch and is in a normal operating status in the switch action stage when the fault occurs in the branch xy, $F_i^{xy,PF}$ represents a maintenance-influence mark of a node i in the switch action stage when a fault occurs in the branch xy, $F_i^{xy,PF}=0$ represents that the node i is influenced by maintenance of the faulty branch and is in a power-off status in the switch action stage when the fault occurs in the branch xy, $F_i^{xy,PF}=1$ represents that the node i is not influenced by the maintenance of the faulty branch and is in a normal operating status in the switch action stage when the fault occurs in the branch xy, $F_j^{xy,PF}$ represents a maintenance-influence mark of a node j in the switch action stage when a fault occurs in the branch xy, $F_j^{xy,PF}=0$ represents that the node j is influenced by maintenance of the faulty branch and is in a power-off status in the switch action stage when the fault occurs in the branch xy, $F_j^{xy,PF}=1$ represents that the node j is not influenced by the maintenance of the faulty branch and is in a normal operating status in the switch action stage when the fault occurs in the branch xy; $s_{ij}^{i,xy} \in \{0, 1\}$ represents a status of a switch close to a node i in a branch ij when a fault occurs in a branch xy, $s_{ij}^{i,xy}=1$ represents that the status of the switch is on, and $s_{ij}^{i,xy}=0$ represents that the status of the switch is off, $s_{ij}^{j,xy} \in \{0,1\}$ represents a status of a switch close to a node j in the branch ij when the fault occurs in the branch xy, $s_{ij}^{j,xy}=1$ represents that the status of the switch is on, $s_{ij}^{j,xy}=0$ represents that the status of the switch is off; $D_i^{xy}$ represents a load of a node i when the fault occurs in the branch xy; $D_i$ represents a load of a node i under normal state;

$q_i^{xy}$ represents a power status of the node i after the switch action stage and after that the fault occurs in the branch xy, $q_i^{xy}=1$ represents that the node i is normally powered after the switch action stage and after that the fault occurs in the branch xy, $q_i^{xy}=0$ represents that the node i is in a power-off status after the switch action stage and after that the fault occurs in the branch xy.

16. The apparatus according to claim 9, wherein the power distribution network reliability indexes comprise the $CID_i$, $CIF_i$, SAIDI, SAIFI, ASAI, and EENS.

17. A non-transitory computer-readable storage medium having stored therein instructions that, when executed by a processor of a terminal, causes the terminal to perform a power distribution network reliability index calculation method based on mixed integer linear programming, the method comprising:

determining installation status of components, fault isolation, load transformation supply and action rules of fault recovery when there is a branch fault of the power distribution network, wherein the components include circuit breakers and switches installed at the end of each branch, which are used to isolate the faulty branch circuits and reconfigure the network after a branch circuit failure, and to recover the original power supply network structure after the faulty branch is repaired;

establishing a model for optimizing reliability indexes of a power distribution network based on a mixed integer linear programming model, wherein the model comprises an objective function and constraint conditions, the objective function is for minimizing a system average interruption duration index (SAIDI);

solving the model based on the objective function and the constraint conditions to obtain reliability indexes of the power distribution network; and determining the reliability of the power distribution network based on the reliability indexes, and controlling operation of the power distribution network based on the reliability indexes;

wherein establishing the model for optimizing reliability indexes of the power distribution network based on the mixed integer linear programming model comprises:
determining the objective function; and
determining the constraint conditions;

wherein the constraint conditions comprise a reliability index calculation constraint;

wherein the reliability index calculation constraint is determined by:

$$CID_i = \sum_{xy \in \Upsilon} \lambda_{xy} \tau_{xy}^{SW} p_i^{xy} + \sum_{xy \in \Upsilon} \lambda_{xy}(\tau_{xy}^{RP} - \tau_{xy}^{SW})(1 - q_i^{xy}), \forall i \in \Psi^{LN}$$

$$CIF_i = \sum_{xy \in \Upsilon} \lambda_{xy} p_i^{xy}, \forall i \in \Psi^{LN}$$

$$SAIDI = \frac{\sum_{i \in \Psi^{LN}} NC_i CID_i}{\sum_{i \in \Psi^{LN}} NC_i}$$

$$SAIFI = \frac{\sum_{i \in \Psi^{LN}} NC_i CIF_i}{\sum_{i \in \Psi^{LN}} NC_i}$$

$$ASAI = 1 - \frac{SAIDI}{8760}$$

$$EENS = \sum_{h \in B} \frac{\Delta_h}{8760} \sum_{i \in \Psi^{LN}} CID_i \mu_h L_i$$

where, $CID_i$ represents a customer interruption duration of a node i, $\lambda_{xy}$ represents an annual fault rate of a branch xy, $\tau_{xy}^{SW}$ represents an interruption period of fault isolation action of the branch xy, $\tau_{xy}^{RP}$ represents an interruption period of fault restore of the branch xy, $CIF_i$ represents a customer interruption frequency of the node i, $NC_i$ represents a given number of customers of the node i, SAIDI represents a system average interruption duration index, SAIFI represents a system average interruption frequency index, ASAI represents a system average service availability index, EENS represents an expected energy not supplied, B represents a collection of all load levels, $\Delta_n$ represents a number of hours lasted per year for a load level h, $\mu_h \leq 1$ represents a peak load ratio of the level h, and $L_i$ represents a peak load ratio of the node i.

* * * * *